(12) United States Patent
Lin

(10) Patent No.: US 7,482,722 B2
(45) Date of Patent: Jan. 27, 2009

(54) BRUSHLESS GENERATOR HAVING CORELESS ASSEMBLY

(75) Inventor: Min-Huang Lin, Taipei (TW)

(73) Assignee: Gene Power Holding Co., Ltd., Taipei Hsien (TW)

( * ) Notice: Subject to any disclaimer, the term of this patent is extended or adjusted under 35 U.S.C. 154(b) by 476 days.

(21) Appl. No.: 11/402,030

(22) Filed: Apr. 12, 2006

(65) Prior Publication Data
US 2007/0007839 A1 Jan. 11, 2007

(30) Foreign Application Priority Data
Jul. 11, 2005 (TW) .............................. 94211755 U

(51) Int. Cl.
*H02K 21/00* (2006.01)
(52) U.S. Cl. .................... 310/83; 310/156.32; 310/268

(58) Field of Classification Search ............ 310/268.83, 310/156.32–156.37, 113, 75 R
See application file for complete search history.

(56) References Cited

U.S. PATENT DOCUMENTS

| 4,578,609 | A | * | 3/1986 | McCarty ................. 310/156.24 |
| 5,625,236 | A | * | 4/1997 | Lefebvre et al. ............... 307/41 |
| 5,929,611 | A | * | 7/1999 | Scott et al. ..................... 322/46 |
| 6,700,242 | B2 | * | 3/2004 | Kawamura ................. 310/68 R |
| 6,908,277 | B2 | * | 6/2005 | Jacobsson ..................... 415/43 |
| 2002/0084705 | A1 | * | 7/2002 | Kawamura ................ 310/68 R |
| 2005/0275224 | A1 | * | 12/2005 | Potter et al. .................... 290/43 |

* cited by examiner

*Primary Examiner*—Gary F. Paumen
(74) *Attorney, Agent, or Firm*—Troxell Law Office, PLLC

(57) ABSTRACT

A brushless generator has a high rotation speed, a high usage efficiency, no iron loss and a small mechanical loss while the electric power output of the generator is increased

9 Claims, 4 Drawing Sheets

BRUSHLESS GENERATOR HAVING CORELESS ASSEMBLY

FIELD OF THE INVENTION

The present invention relates to a brushless generator; more particularly, relates to obtaining a high rotation speed, a high usage efficiency, no iron loss and a small mechanical loss while increasing the output efficiency of electricity.

DESCRIPTION OF THE RELATED ART(S)

A generator of a prior art is disclosed in Taiwan, as shown in FIG. 4, comprises a fixed shell 6, a rotating shaft 61, a rotating inner shell 62, a transmission gear set 63, a rotor 64 and a coil ring 65, where the fixed shell 6 has a cylinder shape; two bearing holes are set correspondingly at two ends of the fixed shell 6; a default generator ouput set is deposed in an end of the fixed shell 6; two ends of the rotating shaft 61 are correspondingly pivoted on the bearing holes of the fixed shell 6; an end of the rotating shaft 61 is an input end; the rotating inner shell 62 are pivoted inside the fixed shell 6 with bearing holes to be pivoted on the rotating shaft 61; an inner teeth ring is located at an end of the rotating inner shell 62; a ring-type power output seat is located at another end of the rotating inner shell 62 for electricity transmission to a power output set on the fixed shell; the transmission gear set 63 comprises a first and a second gears; the first gear is fixed on the rotating shaft 61; the second gear is pivoted on an inner surface at an end of the fixed shell 6; two surfaces of the second gear have engagements with the first gear and the inner teeth ring respectively to reversely rotate the rotating inner shell 62 by the transmission gear set 63 when the rotating shaft 61 rotates; the rotor 64 is deposed on the rotating shaft 61 at a section inside of the rotating inner shell 62; magnet is set around the rotor 64; and, the coil ring 65 is fixed on the inner surface of the rotating inner shell 62 corresponding to the magnet of the rotor 64. Consequently, electric power can be generated by the generator of the prior art.

Although the generator of the prior art can generate electric power, some iron loss and mechanical loss may occur owing to the brush and the core in it with more complex structure. The prior art do not comprise high rotation speed and high efficiency; nor do electricity output increased. So, the prior art does not fulfill users' requests on actual use.

SUMMARY OF THE INVENTION

Therefore, the main purpose of the present invention is to obtain a high rotation speed, a high usage efficiency, no iron loss and a small mechanical loss while increasing the output efficiency of electricity by using a speed-up device.

To achieve the above purpose, the present invention is a brushless generator having coreless assembly, comprising an actuator, a power generator head and a voltage stabilizer, where a first shaft is flexibly penetrated through center of the power generator head; a coreless wound stator is deposed on the first shaft; collar plates are corresponding to two surfaces of the coreless wound stator; at least one collar plate comprises a permanent magnet corresponding to the coreless wound stator; the coreless wound stator is connected with a lead wire; the voltage stabilizer is connected with the lead wire; and a speed-up device is deposed between the actuator and the power generator head, comprising a carrying seat, a second shaft, a teeth part, a plurality of tower planet gears, an annular gear, a connecting seat, a third shaft and a shell. Accordingly, a novel brushless generator having coreless assembly is obtained.

BRIEF DESCRIPTION OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
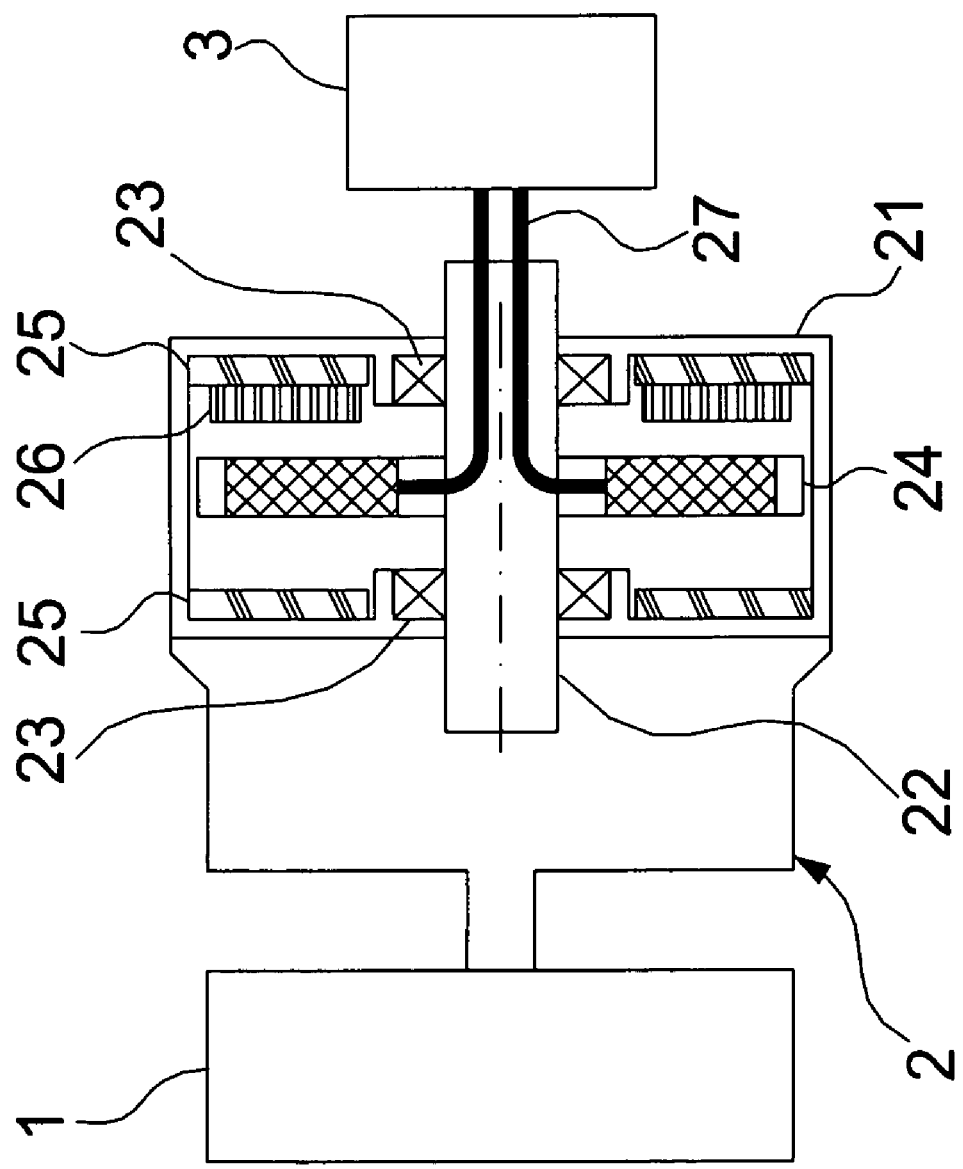
FIG. 1 is a cross-sectional view showing a first preferred embodiment according to the present invention.

Please refer to FIG. 1, which is a cross-sectional view showing a first preferred embodiment according to the present invention. As shown in the figure, the present invention is a brushless generator having coreless assembly, comprising an actuator 1, a power generator head 2 and a voltage stabilizer 3, where the generator has a high rotation speed, a high usage efficiency, no iron loss and a small mechanical loss.

The actuator 1 can be a mechanical engine power, a natural wind force, a water force, an animal power, etc.

The power generator head 2 comprises a case 21 connected with the actuator 1. A first shaft 22 is flexibly penetrated through center of the case 21. A bearing 23 is correspondingly located between the case 21 and each of two opposite ends of the first shaft 22. A coreless wound stator 24 is deposed on the first shaft 22. The case 21 comprises two collar plates 25 inside corresponding to two surfaces of the core less wound stator 24. At least one collar plate 25 comprises a permanent magnet 26 corresponding to the coreless wound stator 24. And, the coreless wound stator 24 is connected with a lead wire 27.

The voltage stabilizer is connected with the lead wire 27 of the power generator head 2. Thus, a novel brush less generator having coreless assembly is obtained.

Figure 2:
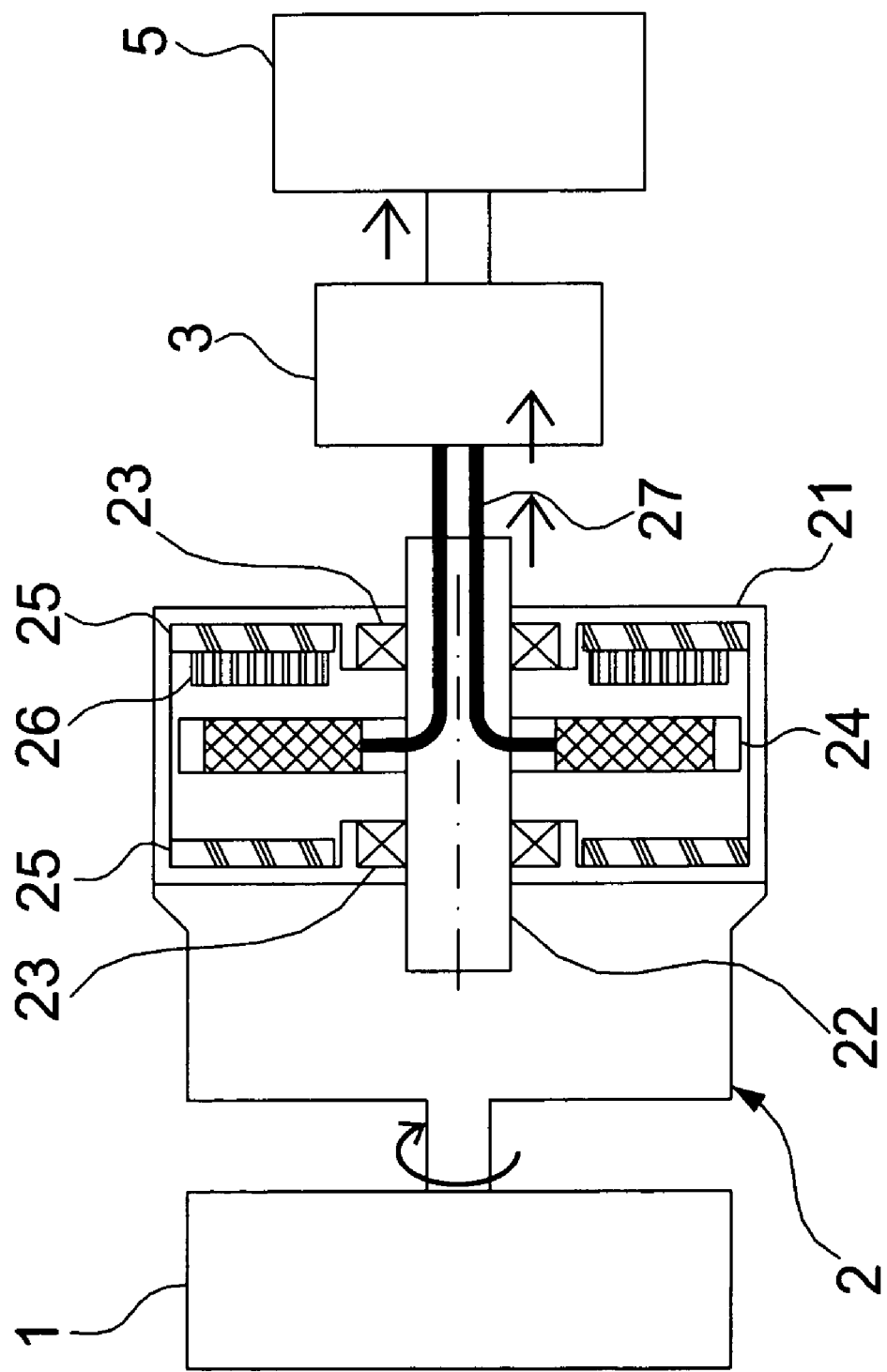
FIG. 2 is a cross-sectional view showing a state of use of the first preferred embodiment according to the present

Please refer to FIG. 2, which is a cross-sectional view showing a state of use of the first preferred embodiment according to the present invention. As shown in the figure, on u sing the first preferred embodiment, an actuator 1 is rotated by a required power so that a case 21 of a power generator head 2 follows the rotation of the actuator 1. When the case 21 of the power generator head 2 rotates, a permanent magnet 26 on a collar plate 25 which is corresponding to a coreless wound stator 24 outputs an electric power to a lead wire 27 of a coreless wound stator 24, where the power generator head 2 can obtain a high rotation speed, a high usage efficiency, no iron loss and a small mechanical loss. The power generated by the coreless wound stator is transferred to a voltage stabilizer 3 through the lead wire 27 so that a required voltage can be obtained through a proper transformation done by the voltage stabilizer 3. Later, the power with the required voltage is transferred to an electric object 5 connected so that the electric object 5 can obtain a required electric power source.

Figure 3:
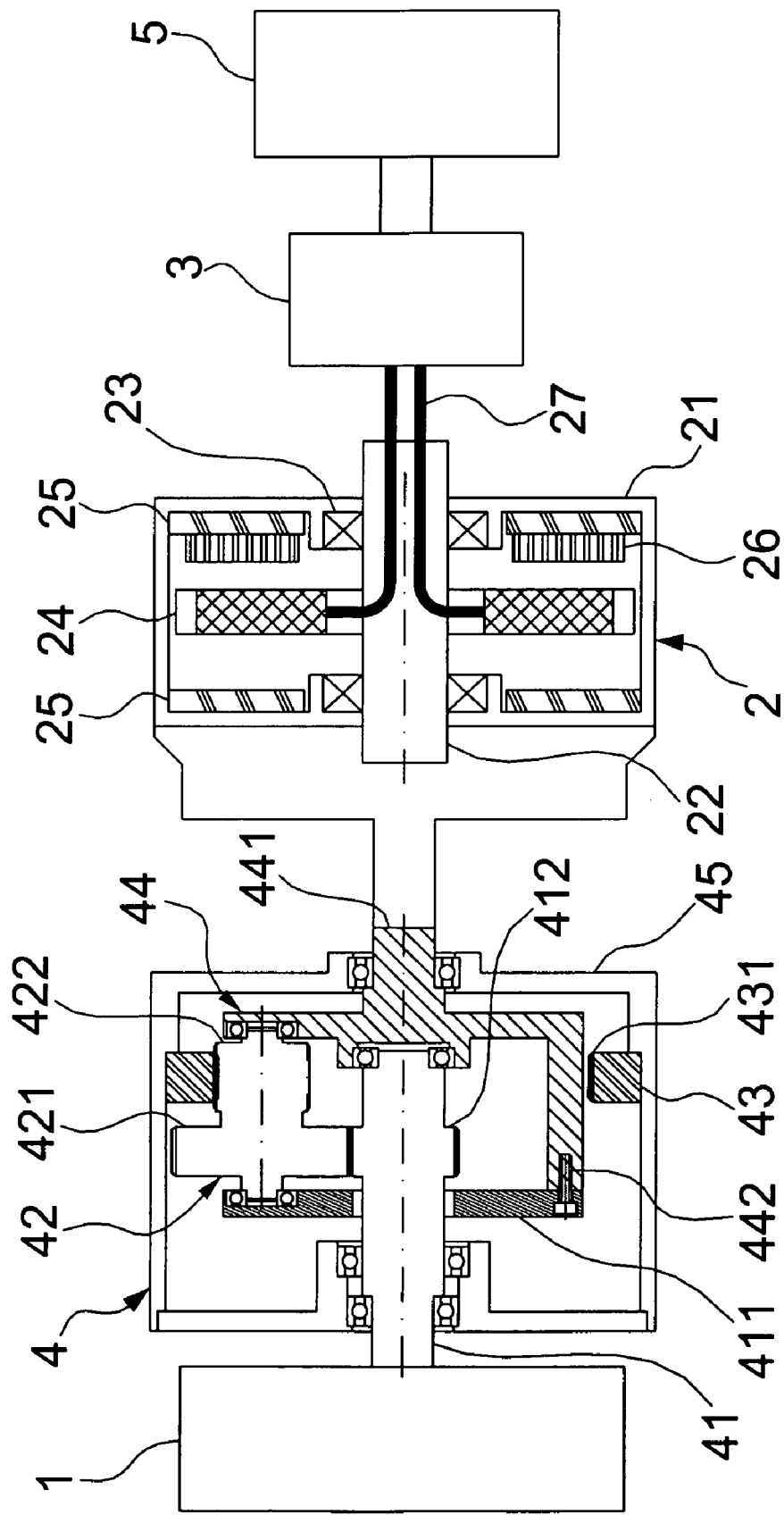
FIG. 3 is a cross-sectional view showing a state of use of a second preferred embodiment according to the present invention.
Figure 4:
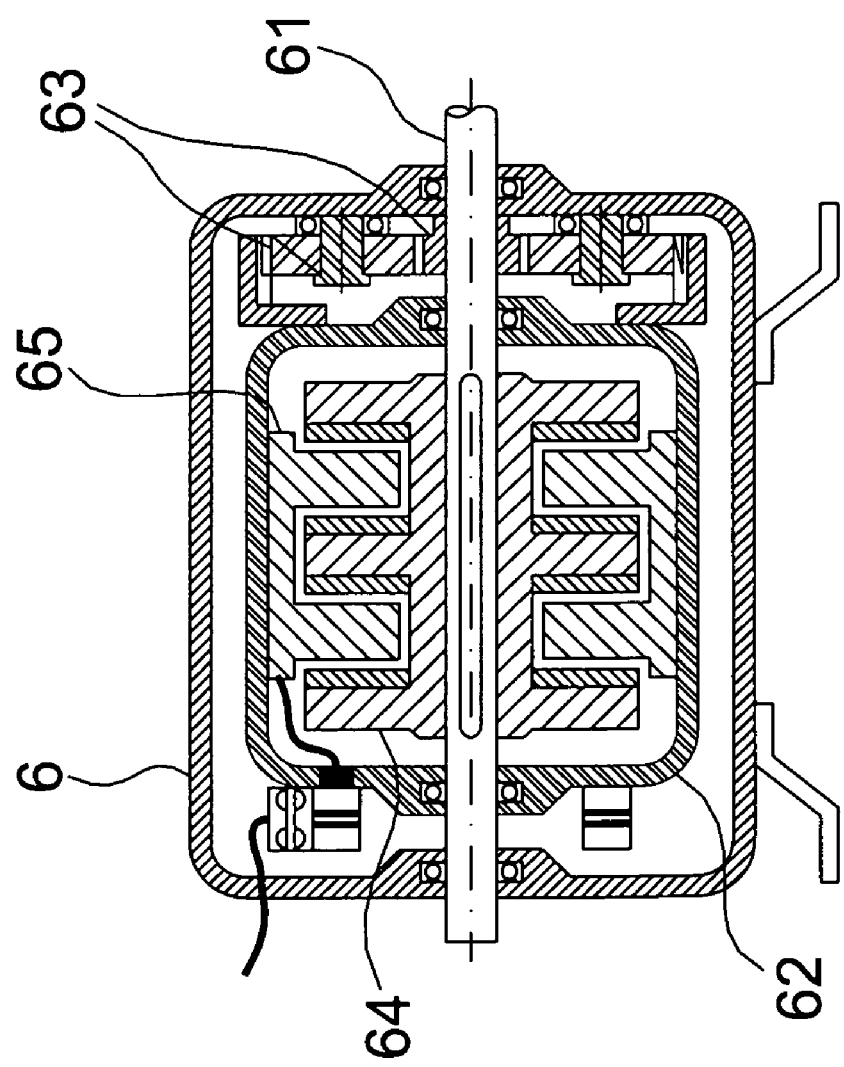
FIG. 4 is a cross-sectional view of a prior art.

Please refer to FIG. 3, which is a cross-sectional view showing a state of use of a second preferred embodiment according to the present invention. As shown in the figure, the present invention is a brushless generator having coreless assembly, comprising an actuator 1, a speed-up device 4, a power generator head 2 and a voltage stabilizer 3, where the generator has a high rotation speed, a high usage efficiency, no iron loss and a small mechanical loss.

The actuator 1 can be a mechanical engine power, a natural wind force, a water force, an animal power, etc.

The speed-up device 4 is a device to increase rotation rate of the actuator 1, comprising a shell 45, an annular gear 43, a second shaft 41, a carrying seat 411, a plurality of tower planet gears 42, and a connecting seat 44. The annular gear 43 sheathe s around the tower planet gears. The second shaft 41 comprises the carrying seat 411 and a teeth part 412; and is connected to the actuator 1. The tower planet gears 42 are deposed on the carrying seat 411 and each of the tower planet gears 42 comprises an engagement to the teeth part 412. The connecting seat comprises a third shaft 441 and is connected with the second shaft 41. The shell 45 contains the above components. The tower planet gear 42 comprises a wheel 421 and a pinion 422 and the wheel 421 comprises an engagement with the teeth part 412 of the second shaft 41. The annular gear 43 sheathes around outside surface of the pinion 422 of the tower planet gear 42; and comprises a teeth part 431 encircling the pinion 422 to have an engagement with the pinion 422. The connecting seat 44 is fixed on the carrying seat 411 with a fixing member 442; and is connected with the tower planet gears 42. The second shaft 41 and the third shaft 441 are penetrated through two opposite end surfaces of the shell 45 to be flexibly joined. And, the annular gear 43 is connected with inner surface of the shell 45.

The power generator head 2 comprises a case 21 connected with the third shaft 411 of the speed-up device. A first shaft 22 is flexibly penetrated through center of the case 21. A bearing 23 is correspondingly located between the case 21 and each of two opposite ends of the first shaft 22. A coreless wound stator 24 is deposed on the first shaft 22. The case 21 comprises two collar plates 25 inside corresponding to two surfaces of the coreless wound stator 24. At least one collar plate 25 comprises a permanent magnet 26 corresponding to the coreless wound stator 24. And, the coreless wound stator 24 is connected with a lead wire 27.

The voltage stabilizer is connected with the lead wire 27 of the power generator head 2.

On using the second preferred embodiment, an actuator 1 is rotated by a required power to rotate the second shaft 41 so that the tower planet gear 42 follows to rotate the third shaft 441. Hence, the speed-up device 4 obtains a high rotation speed using the actuator 1 while a case 21 of a power generator head 2 follows the rotation of the speed-up device 4. When the case 21 of the power generator head 2 rotates, a permanent magnet 26 on a collar plate 25 which is corresponding to a coreless wound stator 24 outputs an electric power to a lead wire 27 of a coreless wound stator 24, where the power generator head 2 can obtain a high rotation speed, a high usage efficiency, no iron loss and a small mechanical loss. The power generated by the coreless wound stator is transferred to a voltage stabilizer 3 through the lead wire 27 so that a required voltage can be obtained through a proper transformation done by the voltage stabilizer 3. Later, the power with the required voltage is transferred to an electric object 5 connected so that the electric object 5 can obtain a required electric power source.

To sum up, the present invention is a brush less generator having coreless assembly, where a power generator head in the brush less generator comprises a high rotation speed, a high usage efficiency, no iron loss and a small mechanical loss and so the electricity the power generator head ouputs is increased by using a speed-up device in the brushless generator.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A brushless generator having coreless assembly, comprising:
   (a) an actuator;
   (b) a power generator head comprising a case, said actuator connecting to said case, a first shaft flexibly penetrating through at center of said case, a coreless wound stator deposing on said shaft, two collar plates deposing in said case, said collar plates corresponding to two opposite surfaces of said coreless wound stator, a permanent magnet deposing on at least one of said collar plates, said permanent magnet corresponding to said coreless wound stator, a lead wire connecting to said coreless wound stator; and
   (c) a voltage stabilizer connected with said lead wire of said power generator head.

2. The generator according to claim 1, wherein in a bearing is respectively deposed between said case and each of two ends of said shaft.

3. A brushless generator having coreless assembly, comprising:
   (a) an actuator;
   (b) a speed-up device connected with said actuator to increase rotation rate of said actuator;
   (c) a power generator head comprising a case connected with said speed-up device, a first shaft flexibly penetrating through at center of said case, a coreless wound stator deposing on said first shaft, two collar plates deposing in said case, said collar plates corresponding to two opposite surfaces of said coreless wound stator, a permanent magnet deposing on at least one of said collar plates, said permanent magnet corresponding to said coreless wound stator, a lead wire connecting to said coreless wound stator; and
   (d) a voltage stabilizer connected with said lead wire of said power generator head.

4. The generator according to claim 3
   wherein said speed-up device comprises a shell, an annular gear, a second shaft, a carrying seat, a plurality of tower planet gears, and a connecting seat;
   wherein said annular gear sheathes around said tower planet gears;
   wherein said second shaft comprises a teeth part and is connected to said actuator;
   wherein said tower planet gears are deposed on said carrying seat and each of said tower planet gears comprises an engagement to said teeth part; and
   wherein said connecting seat comprises a third shaft and is connected with said second shaft.

5. The generator according to claim 3, wherein a bearing is respectively located between said case and each of two ends of said first shaft.

6. The generator according to claim 4,
   wherein said tower planet gear comprises a wheel and a pinion, and
   wherein said wheel comprises an engagement with said teeth part of said second shaft.

7. The generator according to claim 4, wherein said annular gear sheathes around outside surface of said pinion of said tower planet gear; and wherein said annular gear comprises a teeth part encircling said pinion to have an engagement with said pinion.

8. The generator according to claim 4, wherein said connecting seat is fixed on said carrying seat; and wherein said connecting seat is connected with said tower planet gear.

9. The generator according to claim 4, wherein said second shaft and said third shaft are penetrated through two opposite end surfaces of said shell to be flexibly joined; and wherein said annular gear is connected with inner surface of said shell.

* * * * *